United States Patent
Ferreira et al.

(10) Patent No.: US 6,615,820 B1
(45) Date of Patent: Sep. 9, 2003

(54) FLAME-STOKING ATTACHMENT FOR A GRILL COOKER

(76) Inventors: Nelson C. Ferreira, 562 MC Roberts Avenue, Toronto Ontario (CA), M6E-4R6; Carlos O. Ferreira, 563 MC Roberts Avenue, Toronto Ontario (CA), M6E-4R6

( * ) Notice: Subject to any disclaimer, the term of this patent is extended or adjusted under 35 U.S.C. 154(b) by 0 days.

(21) Appl. No.: 09/944,002

(22) Filed: Aug. 31, 2001

(51) Int. Cl.⁷ ............................................... F24B 1/185
(52) U.S. Cl. ................................. 126/25 B; 126/15 A
(58) Field of Search ........................... 126/25 B, 15 R, 126/15 A, 25 R; 99/474, 473

(56) References Cited

U.S. PATENT DOCUMENTS

| | | | |
|---|---|---|---|
| 2,950,669 A | * 8/1960 | Terry | 126/25 B |
| 3,347,220 A | * 10/1967 | Barbera | 126/25 B |
| 3,529,556 A | * 9/1970 | Narmes | 126/25 B |
| 3,647,323 A | * 3/1972 | Thomas | 126/25 B |
| 3,697,198 A | * 10/1972 | Holde, Jr. | 126/25 B |
| 3,933,145 A | 1/1976 | Reich | |
| 4,044,750 A | * 8/1977 | Zeigler | 126/25 B |
| 4,516,561 A | * 5/1985 | Stawski et al. | 126/25 B |
| 4,788,905 A | 12/1988 | Von Kohorn | |
| 5,154,159 A | 10/1992 | Knafelc et al. | |
| 5,181,836 A | * 1/1993 | Zeitlin | 99/517 |
| 5,725,356 A | 3/1998 | Carter | |
| D398,386 S | 9/1998 | Chan | |
| 5,996,572 A | 12/1999 | Hagan | |

FOREIGN PATENT DOCUMENTS

JP 61-149728 A * 7/1986 ............. F24B/3/00

* cited by examiner

*Primary Examiner*—Henry Bennett
*Assistant Examiner*—Josiah Cocks

(57) ABSTRACT

A flame-stoking attachment for a grill cooker for stoking the flames and charcoal of the grill cooker to quicken cooking of food. The flame-stoking attachment for a grill cooker includes a housing having a wall, an open top end, and an open bottom end; and also includes a support collar being mounted about the wall of the housing; and further includes a fan assembly being disposed in the housing; and also includes a jointed hose member having a first end which is attached to the open top end of the housing and having a second end; and further includes a nozzle being attached to the second end of the jointed hose member and being adapted to direct fan-driven air upon flames in the grill cooker; and also includes a clip assembly for attaching the housing to a wall of the grill cooker.

8 Claims, 3 Drawing Sheets

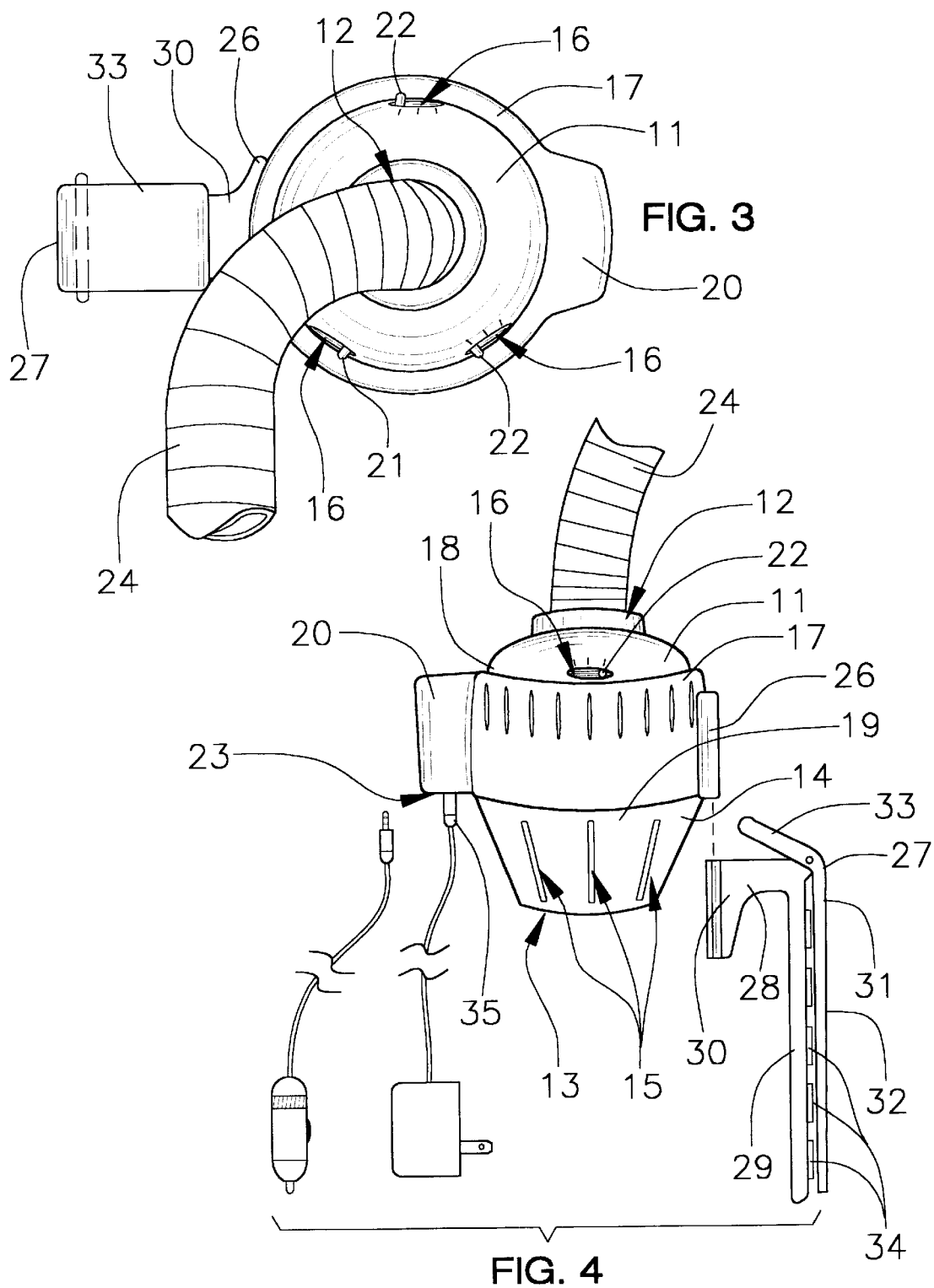

FLAME-STOKING ATTACHMENT FOR A GRILL COOKER

BACKGROUND OF THE INVENTION

1. Field of the Invention

The present invention relates to flame stokers for grill cookers and more particularly pertains to a new flame-stoking attachment for a grill cooker for stoking the flames and charcoal of the grill cooker to quicken cooking of food.

2. Description of the Prior Art

The use of flame stokers for grill cookers is known in the prior art. More specifically, flame stokers for grill cookers heretofore devised and utilized are known to consist basically of familiar expected and obvious structural configurations, notwithstanding the myriad of designs encompassed by the crowded prior art which have been developed for the fulfillment of countless objectives and requirements.

Known prior art includes U.S. Pat. No. 5,996,572; U.S. Pat. No. 5,154,159; U.S. Pat. No. 3,933,145; U.S. Pat. No. 4,788,905; U.S. Pat. No. 5,725,356; and U.S. Pat. No. Des. 398,386.

While these devices fulfill their respective, particular objectives and requirements, the aforementioned patents do not disclose a new flame-stoking attachment for a grill cooker. The inventive device includes a housing having a wall, an open top end, and an open bottom end; and also includes a support collar being mounted about the wall of the housing; and further includes a fan assembly being disposed in the housing; and also includes a jointed hose member having a first end which is attached to the open top end of the housing and having a second end; and further includes a nozzle being attached to the second end of the jointed hose member and being adapted to direct fan-driven air upon flames in the grill cooker; and also includes a clip assembly for attaching the housing to a wall of the grill cooker.

In these respects, the flame-stoking attachment for a grill cooker according to the present invention substantially departs from the conventional concepts and designs of the prior art, and in so doing provides an apparatus primarily developed for the purpose of stoking the flames and charcoal of the grill cooker to quicken cooking of food.

SUMMARY OF THE INVENTION

In view of the foregoing disadvantages inherent in the known types of flame stokers for grill cookers now present in the prior art, the present invention provides a new flame-stoking attachment for a grill cooker construction wherein the same can be utilized for stoking the flames and charcoal of the grill cooker to quicken cooking of food.

The general purpose of the present invention, which will be described subsequently in greater detail, is to provide a new flame-stoking attachment for a grill cooker which has many of the advantages of the flame stokers for grill cookers mentioned heretofore and many novel features that result in a new flame-stoking attachment for a grill cooker which is not anticipated, rendered obvious, suggested, or even implied by any of the prior art flame stokers for grill cookers, either alone or in any combination thereof.

To attain this, the present invention generally comprises a housing having a wall, an open top end, and an open bottom end; and also includes a support collar being mounted about the wall of the housing; and further includes a fan assembly being disposed in the housing; and also includes a jointed hose member having a first end which is attached to the open top end of the housing and having a second end; and further includes a nozzle being attached to the second end of the jointed hose member and being adapted to direct fan-driven air upon flames in the grill cooker; and also includes a clip assembly for attaching the housing to a wall of the grill cooker.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new flame-stoking attachment for a grill cooker which has many of the advantages of the flame stokers for grill cookers mentioned heretofore and many novel features that result in a new flame-stoking attachment for a grill cooker which is not anticipated, rendered obvious, suggested, or even implied by any of the prior art flame stokers for grill cookers, either alone or in any combination thereof.

It is another object of the present invention to provide a new flame-stoking attachment for a grill cooker which may be easily and efficiently manufactured and marketed.

It is a further object of the present invention is to provide a new flame-stoking attachment for a grill cooker which is of a durable and reliable construction.

An even further object of the present invention is to provide a new flame-stoking attachment for a grill cooker which is susceptible of a low cost of manufacture with regard to both materials and labor, and which accordingly is then susceptible of low prices of sale to the consuming public, thereby making such flame-stoking attachment for a grill cooker economically available to the buying public.

Still yet another object of the present invention is to provide a new flame-stoking attachment for a grill cooker which provides in the apparatuses and methods of the prior art some of the advantages thereof, while simultaneously overcoming some of the disadvantages normally associated therewith.

Still another object of the present invention is to provide a new flame-stoking attachment for a grill cooker for rapidly igniting and bringing cold briquettes to the proper cooking or operating temperature.

Still another object of the present invention is to provide a new flame-stoking attachment for a grill cooker for stoking the flames and charcoal of the grill cooker to quicken cooking of food.

Yet another object of the present invention is to provide a new flame-stoking attachment for a grill cooker which includes a housing having a wall, an open top end, and an open bottom end; and also includes a support collar being mounted about the wall of the housing; and further includes a fan assembly being disposed in the housing; and also includes a jointed hose member having a first end which is attached to the open top end of the housing and having a second end; and further includes a nozzle being attached to the second end of the jointed hose member and being adapted to direct fan-driven air upon flames in the grill cooker; and also includes a clip assembly for attaching the housing to a wall of the grill cooker.

Still yet another object of the present invention is to provide a new flame-stoking attachment for a grill cooker that is easy and convenient to use.

Even still another object of the present invention is to provide a new flame-stoking attachment for a grill cooker that can adjustably positioned so that fan-driven air is directed under the charcoal for stoking the flames.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a top plan view of the present invention.

FIG. 4 is an exploded side elevational view of the present invention.

DESCRIPTION OF THE PREFERRED EMBODIMENT

Figure 1:
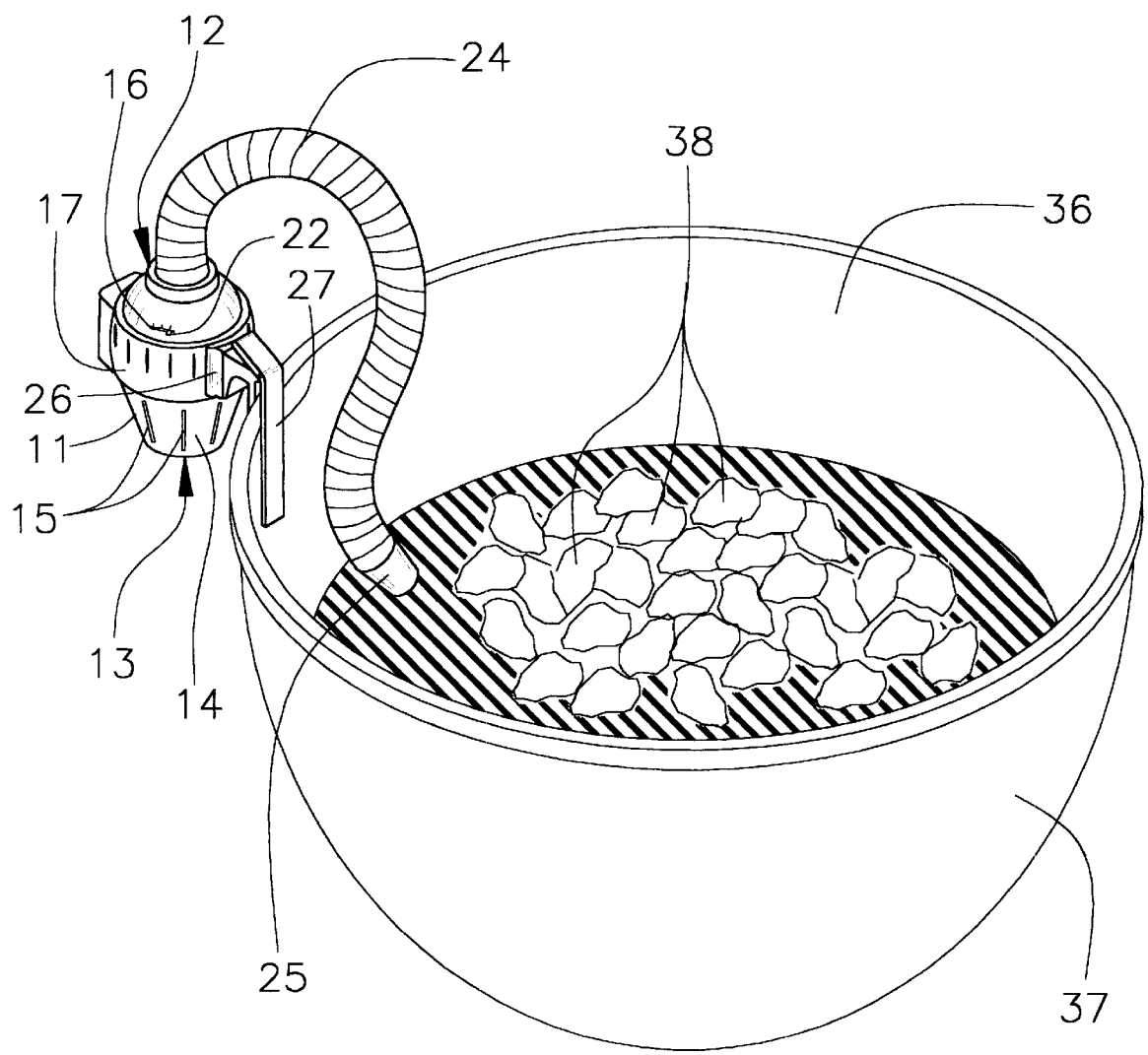
FIG. 1 is a perspective view of a new flame-stoking attachment for a grill cooker according to the present invention and shown in use.
Figure 2:
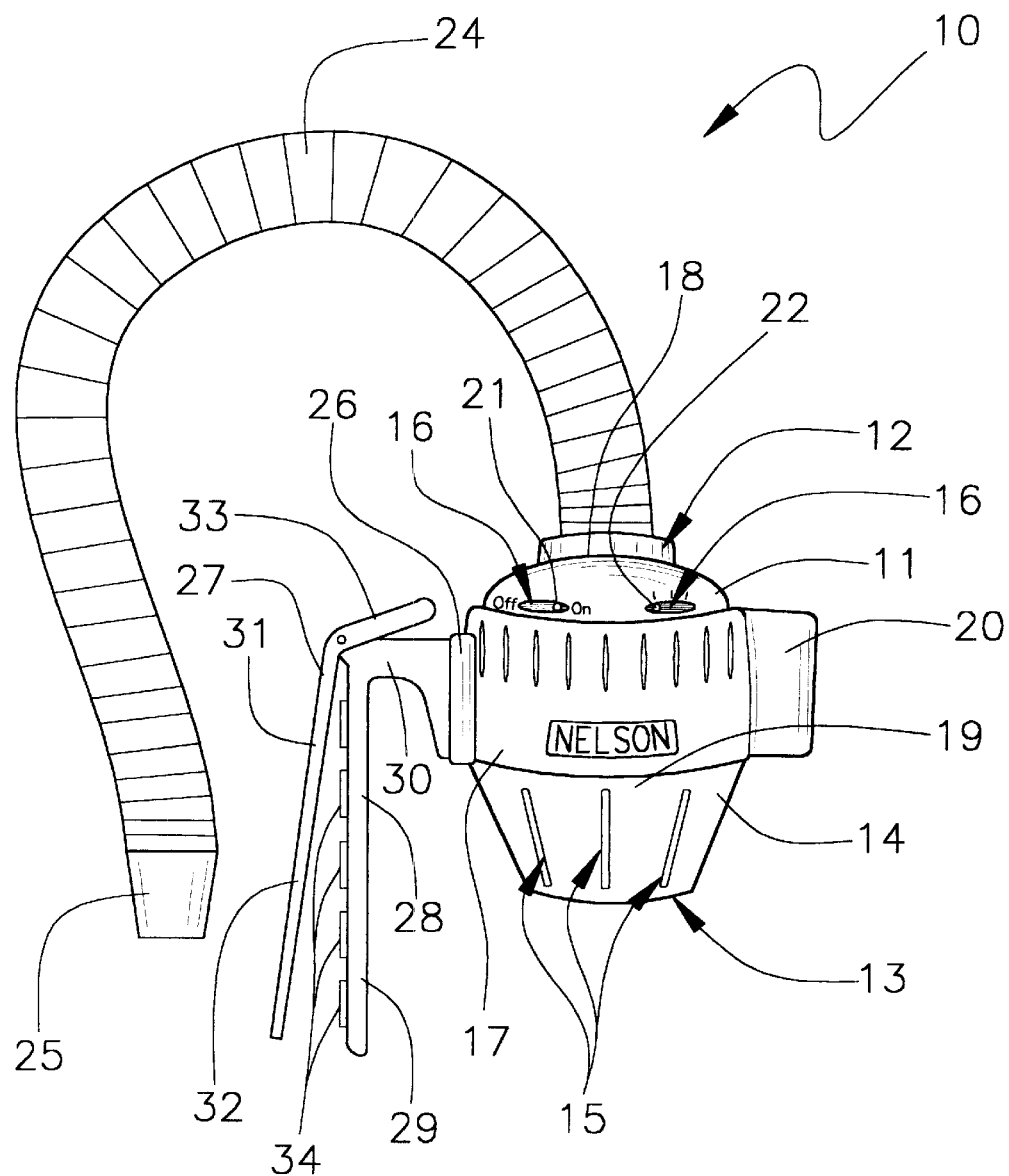
FIG. 2 is a side elevational view of the present invention.

With reference now to the drawings, and in particular to FIGS. 1 through 4 thereof, a new flame-stoking attachment for a grill cooker embodying the principles and concepts of the present invention and generally designated by the reference numeral 10 will be described.

As best illustrated in FIGS. 1 through 4, the flame-stoking attachment for a grill cooker 10 generally comprises a housing 11 having a wall 14, an open top end 12, and an open bottom end 13. The housing 11 includes a plurality of vents 15 being spacedly disposed through the wall 14 thereof, and also includes slots 16 being spacedly disposed through the wall 14 thereof. A support collar 17 is conventionally mounted about the wall 14 of the housing 11.

A fan assembly is conventionally disposed in the housing 11. The fan assembly includes a motor 18 being disposed in the housing 11, and also includes a fan member 19 being rotatably and conventionally connected to the motor 18, and further includes switch members 21,22 being movably disposed through the slots 16 of the housing 11 and being conventionally connected to the motor 18 for energizing the fan member 19, and also includes a power source 20 being conventionally connected to the motor 18 and to the switch members 21,22. The switch members 21,22 include an on/off switch member 21 and also include variable speed switch members 22. The power source 20 includes a battery pack being removably disposed in the support collar 17, and further includes a jack 23 being disposed in a wall of the support collar 17 and being conventionally connected to the battery pack and being adapted to receive a power cord adapter plug 35.

A jointed hose member 24 has a first end which is conventionally attached to the open top end 12 of the housing 11 and has a second end. A nozzle 25 is conventionally attached to the second end of the jointed hose member 24 and is adapted to direct fan-driven air upon flames in the grill cooker 36.

A clip assembly for attaching the housing 11 to a wall 37 of the grill cooker 36 includes bracket members 26 being spacedly and conventionally attached to the support collar 17, and also includes a clip member 27 being removably attached to the bracket members 26 and being attachable to the wall 37 of the grill cooker 36. The clip member 27 includes a first jaw member 28 having an elongate main portion 29 and an end portion 29 being angled relative to the elongate main portion 29 and being removably attached to the bracket members 26, and also includes a second jaw member 31 being hingedly attached to the first jaw member 28 and having an elongate main portion 32 which is biasedly-disposed toward the elongate main portion 29 of the first jaw member 28, and also having a lever portion 33 being angled relative to the elongate main portion 32 for pivoting the elongate main portion 32 of the second jaw member 31 away from the elongate main portion 29 of the first jaw member 28. The clip member 27 further includes a plurality of gripping members 34 being spacedly and conventionally attached along a length of the elongate main portion 29 of the first jaw member 28.

In use, the user clips the clip member 27 upon the wall 37 of the grill cooker 36 and directs the nozzle 25 toward and under the charcoal 38 to stoke the flames so that the cooking time will be substantially reduced because the charcoal 38 is kept hot.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A flame-stoking attachment for a grill cooker comprising:
    a housing having a wall, an open top end, and an open bottom end;
    a support collar being mounted about said wall of said housing;
    a fan assembly being disposed in said housing;
    a jointed hose member having a first end which is attached to said open top end of said housing and having a second end;
    a nozzle being attached to said second end of said jointed hose member and being adapted to direct fan-driven air upon flames in the grill cooker;
    a clip assembly for attaching said housing to a wall of the grill cooker; and
    wherein said clip assembly includes bracket members being spacedly attached to said support collar, and also includes a clip member being removably attached to said bracket members and being attachable to the wall of the grill cooker, said clip member being slidably positioned between said bracket members such that said bracket members selectively couple said clip member to said support collar when said clip member is to be attached to the wall of the grill cooker, said clip member being slidably removed from said bracket members to separate said clip member from said collar member to facilitate storage when not in use.

2. A flame-stoking attachment for a grill cooker as described in claim 1, wherein said housing includes a plurality of vents being spacedly disposed through said wall thereof, and also includes slots being spacedly disposed through said wall thereof.

3. A flame-stoking attachment for a grill cooker as described in claim 2, wherein said fan assembly includes a motor being disposed in said housing, and also includes a fan member being rotatably connected to said motor, and further includes switch members being movably disposed through said slots of said housing and being connected to said motor for energizing said fan member, and also includes a power source being connected to said motor and to said switch members.

4. A flame-stoking attachment for a grill cooker as described in claim 3, wherein said switch members includes an on/off switch member and also includes variable speed switch members.

5. A flame-stoking attachment for a grill cooker as described in claim 3, wherein said power source includes a battery pack being removably disposed in said support collar, and further includes a jack being disposed in a wall of said support collar and being connected to said battery pack and being adapted to receive a power cord adapter plug.

6. A flame-stoking attachment for a grill cooker as described in claim 1, wherein said clip assembly includes bracket members being spacedly attached to said support collar, and also includes a clip member being removably attached to said bracket members and being attachable to the wall of the grill cooker.

7. A flame-stoking attachment for a grill cooker as described in claim 1, wherein said clip member includes a first jaw member having an elongate main portion and an end portion being angled relative to said elongate main portion and being removably attached to said bracket members, and also includes a second jaw member being hingedly attached to said first jaw member and having an elongate main portion which is biasedly-disposed toward said elongate main portion of said first jaw member and also having a lever portion being angled relative to said elongate main portion for pivoting said elongate main portion of said second jaw member away from said elongate main portion of said first jaw member, said clip member further including a plurality of gripping members being spacedly attached along a length of said elongate main portion of said first jaw member.

8. A flame-stoking attachment for a grill cooker comprising:
    a housing having a wall, an open top end, and an open bottom end, said housing including a plurality of vents being spacedly disposed through said wall thereof, and also including slots being spacedly disposed through said wall thereof;
    a support collar being mounted about said wall of said housing;
    a fan assembly being disposed in said housing, said fan assembly including a motor being disposed in said housing, and also including a fan member being rotatably connected to said motor, and further including switch members being movably disposed through said slots of said housing and being connected to said motor for energizing said fan member, and also including a power source being connected to said motor and to said switch members, said switch members including an on/off switch member and also including variable speed switch members, said power source including a battery pack being removably disposed in said support collar, and further including a jack being disposed in a wall of said support collar and being connected to said battery pack and being adapted to receive a power cord adapter plug;
    a jointed hose member having a first end which is attached to said open top end of said housing and having a second end;
    a nozzle being attached to said second end of said jointed hose member and being adapted to direct fan-driven air upon flames in the grill cooker; and
    a clip assembly for attaching said housing to a wall of the grill cooker said clip assembly including bracket members being spacedly attached to said support collar, and also including a clip member being removably attached to said bracket members and being attachable to the wall of the grill cooker, said clip member being slidably positioned between said bracket members such that said bracket members selectively couple said clip member to said support collar when said clip member is to be attached to the wall of the grill cooker, said clip member being slidably removed from said bracket members to separate said slip member from said collar member to facilitate storage when not in use, said clip member including a first jaw member having an elongate main portion and an end portion being angled relative to said elongate main portion and being removably attached to said bracket members, and also including a second jaw member being hingedly attached to said first jaw member and having an elongate main portion which is biasedly-disposed toward said elongate main portion of said first jaw member, and also having a lever portion being angled relative to said elongate main portion for pivoting said elongate main portion of said second jaw member away from said elongate main portion of said first jaw member said clip member further including a plurality of gripping members being spacedly attached along a length of said elongate main portion of said first jaw member.

* * * * *